United States Patent [19]

Kato et al.

[11] 3,925,618

[45] Dec. 9, 1975

[54] VOICE SWITCH CIRCUITS FOR USE IN LOUDSPEAKING TELEPHONE CIRCUITS

[75] Inventors: Kunihiro Kato, Hachiaji; Ryoichi Matsuda, Musashino; Ryoichi Okayasu, Tokyo, all of Japan

[73] Assignee: Nippon Telegraph and Telephone Public Corporation, Tokyo, Japan

[22] Filed: Feb. 12, 1975

[21] Appl. No.: 549,192

[30] Foreign Application Priority Data

May 2, 1974 Japan .................................. 49-48683

[52] U.S. Cl. ........... 179/1 VC; 179/81 B; 179/1 HF

[51] Int. Cl.$^2$ ........................................... H04M 1/60

[58] Field of Search .. 179/1 VC, 1 HF, 1 FS, 170.2, 179/170.4, 170.8, 170 R, 170 B, 1 H, 81 B, 1 CN

[56] References Cited

UNITED STATES PATENTS

| | | | |
|---|---|---|---|
| 3,660,603 | 5/1972 | Andersen | 179/1 VC |
| 3,725,585 | 8/1973 | Moniak et al. | 179/1 HF |
| 3,745,262 | 7/1973 | Brolin et al. | 179/81 B |
| 3,751,602 | 8/1973 | Breeden | 179/81 B |

*Primary Examiner*—Kathleen H. Claffy
*Assistant Examiner*—Tommy P. Chin
*Attorney, Agent, or Firm*—Charles E. Pfund, Esq.

[57] ABSTRACT

In a voice switch circuit for use in a loudspeaking telephone circuit of the class comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting circuit is higher than the signal level of the receiving circuit for inserting a loss in the receiving circuit thereby establishing a transmitting condition, the voice switch circuit is constituted by a control variable loss circuit inserted between the receiving circuit and the main comparator, a second comparator for comparing the output signal level from the control variable loss circuit with the signal level of the transmitting circuit, and means connected between the second comparator and the control variable loss circuit for operating the control variable loss circuit under the receiving condition for decreasing the level difference between two inputs of the main comparator.

15 Claims, 7 Drawing Figures

FIG. 1

VOICE SWITCH CIRCUITS FOR USE IN LOUDSPEAKING TELEPHONE CIRCUITS

BACKGROUND OF THE INVENTION

This invention relates to a voice switch circuit and more particularly to a voice switch circuit for use in a loudspeaking telephone circuit in which a transmitting variable loss circuit and a receiving variable loss circuit which are inserted in the transmitting and receiving circuit of the loudspeaking telephone circuit are controlled in the opposite manner in accordance with the voice signal through said transmitting and receiving circuits.

As is well recognized in the art, a voice switch circuit (hereinafter, often abbreviated as VS circuit) has a function of preventing howling of a loudspeaking telephone circuit. Typical voice switch circuit comprises a comparator for comparing the levels of the voice signals in the transmitting circuit and the receiving circuit, a variable loss circuit for the transmitting circuit responsive to the output from the comparator for inserting a loss in the transmitting circuit and a variable loss circuit for the receiving circuit responsive to the output from the comparator for inserting a loss in the receiving circuit. Where a received signal presents, a portion of the received signal is broadcasted by a loudspeaker and enters into a microphone as a round signal, but under these conditions the comparator judges that the signal level in the receiving circuit is higher than the signal level in the transmitting circuit whereby a definite loss is inserted in the transmitting line variable loss circuit so as to decrease to zero the loss in the receiving line variable loss circuit. As a consequence, it is possible to listen the received signal at an adequate level without being attenuated by the receiving line variable loss circuit. At the same time, the transmitting circuit variable loss circuit inserts a loss in the transmitting circuit thereby preventing howling. The condition in which a loss is inserted in the transmitting line as above described is herein termed the "receiving condition." On the other hand, where there is no received signal and only the transmitting signal is supplied to the microphone the comparator functions to insert a loss in the receiving circuit variable loss circuit and to reduce to zero the loss in the transmitting circuit variable loss circuit for preventing the howling. The condition in which a loss is inserted in the receiving circuit is herein termed the "transmitting condition." Where a speech is transmitted through the microphone under said receiving condition, the level of the sum of a portion of the transmitted signal and a portion of the received signal which is supplied to the microphone from the loudspeaker as the round signal becomes higher than the level of a signal applied to the comparator from the receiving circuit with the result that the comparator changes the condition of the loudspeaking telephone circuit to the transmitting condition thus enabling offering of a transmitting signal.

In the VS circuit descrived above, during the receiving condition, as the signal level in the receiving circuit which is applied to the comparator is substantially higher than the signal level in the transmitting circuit, even when a speech is offered to the microphone during receiving, it would be extremely difficult to change the VS circuit from the receiving condition to the transmitting condition. Even when the transmitting condition is attained, the initial syllable of the speech burst of the transmitting signal is substantially cut off by the transmitting variable loss circuit thus greatly distorting the speech. Such problems regarding difficulty in the offering and cut off of the initial syllable of the speech burst also present in a case where the offering of a received signal is made during the transmitting condition. In this manner, the prior art voice switch circuit has a serious defect that the intitial syllable of the speech burst is lost due to the difficulty in the offering of the transmitting and received signals.

As one approach to this problem it has been proposed a method in which the VS circuit is designed such that upon reception of a receiving signal the signal level of the transmitting circuit which is applied to the comparator is made to the approximately equal to the signal level in the receiving circuit by suitable selecting the gains of the transmitting amplifier and the receiving amplifier. By so designing, even when a small quantity of the transmitting signal enters into the microphone, the transmitting signal level to the comparator will readily overcome the receiving circuit signal level with the result that it is ready for the VS circuit to change to the transmitting condition from the receiving condition. With such a design, however, if the user varies the position of the loudspeaker or the microphone, even only a little, the level of the signal supplied to the comparator from the transmitting circuit would vary substantially. In the worst case, even when a receiving signal is applied the level of the signal supplied to the comparator from the transmitting circuit will become higher than that of the signal in the receiving circuit thus resulting in a so-called receiving signal blocking misoperation in which the VS circuit is changed to the transmitting condition. Even if the VS circuit were designed to make substantially equal the signal level from the transmitting circuit to the comparator and the signal level from the receiving circuit under transmitting condition, small degration of the characteristics of the anti-sidetone circuit of the telephone set would cause a misoperation of the transmitting blocking action. More particularly, if the voice switch circuit were designed so as to minimize the difference in the levels of the signals applied to the comparator from the transmitting and the receiving circuits under the transmitting and receiving conditions there is no misoperation and offering is readily permitted under external conditions (that is the acoustic coupling between the speaker and the microphone and the anti-sidetone characteristic of the anti-sidetone circuit) which coincide with the conditions that were taken into consideration when designing the voice switch circuit, but slight deviation of the external conditions will result in the misoperation of the transmitting or receiving blocking action. In other words, the prior art design described above is extremely sensitive to the variation in the external conditions and hence is not practical.

SUMMARY OF THE INVENTION

It is therefore an object of this invention to provide an improved voice switch circuit capable of eliminating the difficulties of the prior art voice switch circuit, that is a VS circuit whose circuit parameters are automatically controlled so as to minimize the difference in the levels of the two input signals applied to a comparator from the transmitting and receiving circuits in accordance with various conditions of use of the loudspeaking telephone set and to maintain the transmitting and receiving conditions at stable states.

Another object of this invention is to provide an improved voice switch circuit wherein a comparator detects the difference in the levels of the transmitting signal detected from the transmitting circuit and detected from the receiving circuit when the user of the loudspeaking telephone set transmits a speech and wherein the transmitting signal detected from a transmitting circuit is compressed so as to decrease the defference in the levels.

Still another object of this invention is to provide an improved voice switch circuit wherein the comparator detects the difference in the levels of a portion of the received signal and of the round signal which is transmitted from the received signal to the microphone through the acoustic field and detected by the microphone when the user of the loudspeaking telephone set receives a speech and the received signal is compressed so as to minimize the difference in the signal levels.

A further object of this invention is to provide a novel voice switch circuit of the type wherein circuit parameters are automatically set and when external conditions vary the original parameters are restored for the purpose of resetting appropriate circuit parameters for new circuit conditions.

Still further object of this invention is to provide an improved voice switch circuit which is designed to decrease its threshold value in an interlocked relation with the control of the transmitting signal for the purpose of preventing increase in the threshold value of the voice switch thus interrupting the transmitting signal which is caused by the compression control of the transmitting signal.

According to this invention, there is provided a voice switch circuit for use in a loudspeaking telephone circuit of the class comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting circuit is higher than the signal level of the receiving circuit for inserting a loss in the receiving circuit thereby establishing a transmitting condition, characterized in that the voice switch circuit comprises a control variable loss circuit inserted between the receiving circuit and the main comparator, a second comparator for comparing the output signal level from the control variable loss circuit with the signal level of the transmitting circuit, and means connected between the second comparator and the control variable loss circuit for operating the control variable loss circuit under the receiving condition for decreasing the level difference between two inputs of the main comparator.

According to this invention, there is provided a modified voice switch circuit which comprises a control variable amplifier circuit inserted between the transmitting circuit and the main comparator, a second comparator for comparing the output level of the control variable amplifier circuit with the signal level of the receiving circuit, and means connected between the second comparator and the control variable amplifier circuit for operating the control variable amplifier circuit under the receiving condition for minimizing the difference in the levels of two inputs to the main comparation.

A still further modified voice switch circuit of this invention comprises a first control variable loss circuit inserted between the receiving circuit and the main comparator, a second control variable loss circuit inserted between the transmitting circuit and the main comparator, first and second comparators for comparing the output signal level of the first control variable loss circuit with the output signal level of the second control variable loss circuit, a first memory device connected between the first comparator and the first control variable loss circuit for memorizing the output level of the first comparator for maintaining the loss in the first control variable loss circuit only under the receiving condition, a second memory device connected between the second comparator and the second control variable loss circuit for memorizing the output level of the second comparator for maintaining the loss in the second control variable loss circuit only under the transmitting condition, first reset means for resetting the content of the first memory device when the circuit is switched to a transmitting condition, second reset means for resetting the content of the second memory device when the circuit is switched to the receiving condition, and circuit means for increasing the gain of the main comparator in accordance with the output level of the second memory device during the transmitting condition.

BRIEF DESCRIPTION OF THE DRAWINGS

Other objects and advantages of the invention can be more fully understood from the following detailed description taken in conjunction with the accompanying drawings in which.

DESCRIPTION OF THE PREFERRED EMBODIMENTS

Figure 1:
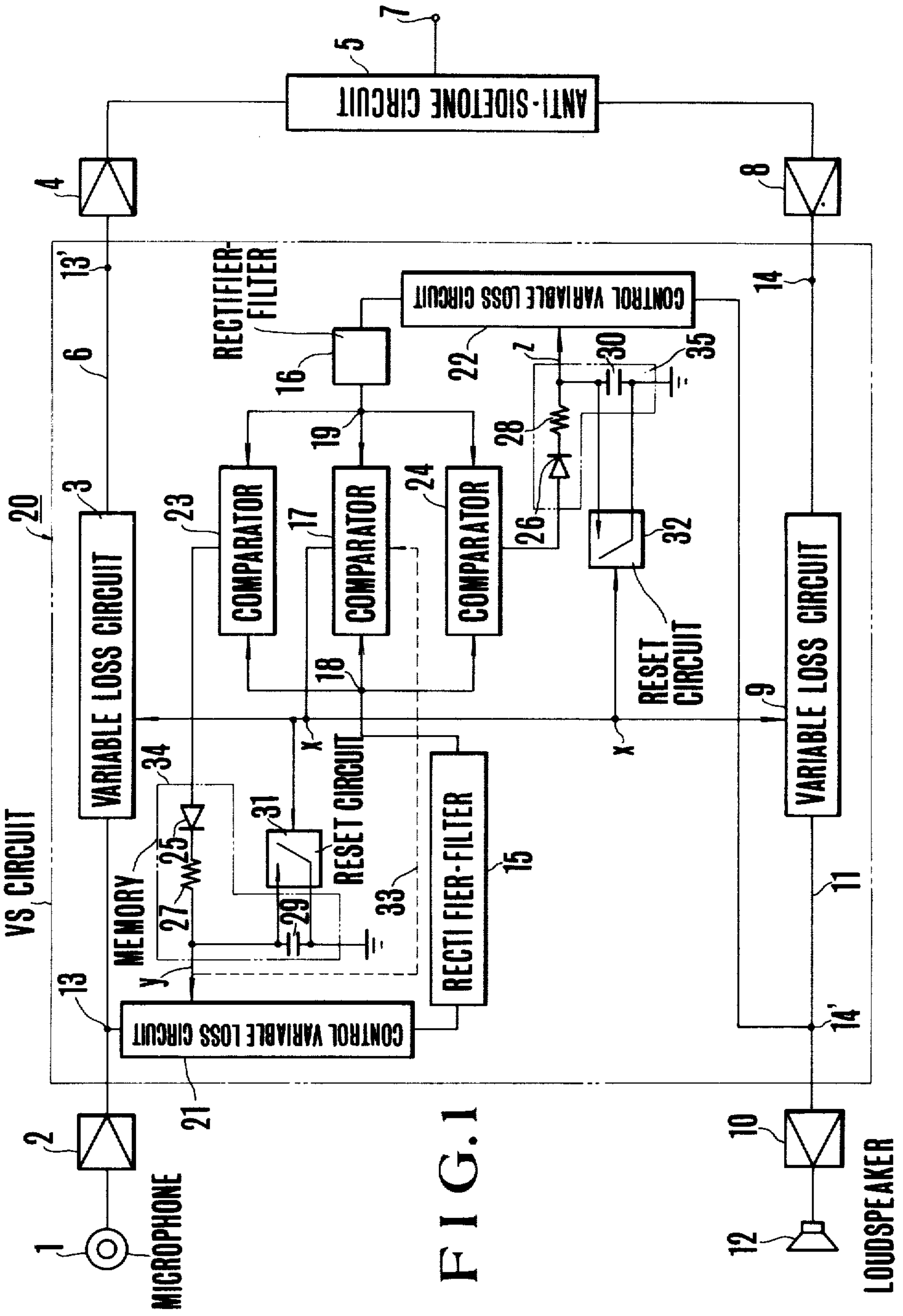
FIG. 1 is a block diagram of one example of the novel voice switch circuit embodying the invention.

The loudspeaking telephone circuit shown in FIG. 1 and utilizing a novel VS circuit of this invention comprises a microphone 1, transmitting amplifiers 2 and 4, an anti-sidetone circuit 5 receiving amplifiers 8 and 10, a loudspeaker 12 which are used in the known telephone circuit, and a novel VS circuit 20 embodying the invention. The VS circuit 20 comprises a variable loss circuit 3 inserted in the transmitting circuit 6 with its input terminal 13 and output terminal 13' connected to the output of the transmitting amplifier 2 and the input of the transmitting amplifier 4. A variable loss circuit 9 is included in the receiving circuit 11 with its input terminal 14 and output terminal 14' connected to the output and input of receiving amplifiers 8 and 10 respectively. The input terminal 13 is connected to one input 18 of a comparator 17 via a control variable loss circuit 21 and a rectifier-filter circuit 15, whereas the output terminal 14' is connected to the other input 19 of the comparator 17 via a control variable loss vircuit 22 and a rectifier-filter circuit 16. The input terminals of the comparator 17 are connected to respective one inputs of comparators 23 and 24. The output of the comparator 23 is coupled to the control variable loss circuit 21 through a memory circuit 34 comprising a diode 25, a resistor 27 and a capacitor 29, whereas the output from the comparator 24 is coupled to the control variable loss circuit 22 through a memory circuit 35 similarly comprising a diode 26, a resistor 28 and a capacitor 30. The output from the comparator 17 is used to control the variable loss circuits 3 and 9 and reset circuits 31 and 32.

Figure 2:
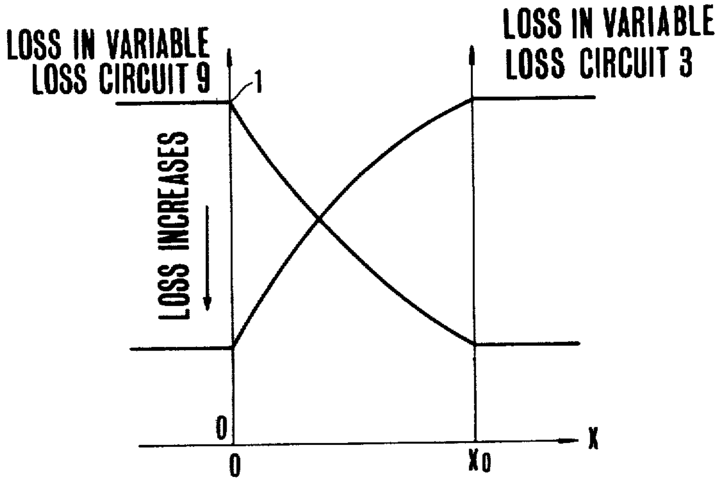
FIG. 2 is a graph showing the characteristics of a variable loss circuit utilized for preventing howling.
Figure 3:
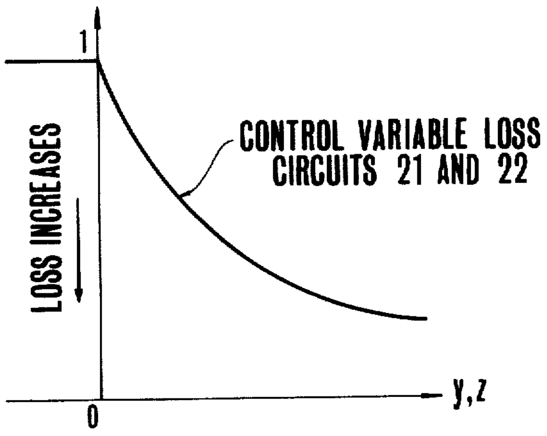
FIG. 3 is a graph showing the characteristics of a control variable loss circuit for compressing the control signal.

As shown by FIG. 2, the variable loss circuits provided for the purpose of preventing howling are oppositely controlled by the output (abscissa $x$) from the comparator 17 in a manner well known in the art. The control variable loss circuits 21 and 22 are controlled by the outputs $y$ and $z$ from the comparators 23 and 24 and increase their losses as the outputs $y$ and $z$ (shown by the abscissa) increase in the positive direction as shown in FIG. 3.

In the no signal state, that is neither transmitting and receiving signal presents $$x = y = z = 0.$$

Then as can be noted from FIG. 2, the VS circuit is set to a receiving condition in which a definite loss is inserted in the variable loss circuit 3. Further, as FIG. 3 shows, no loss is inserted in the control variable loss circuits 21 and 22. When a receiving signal is received from a telephone line 7, a portion thereof is detected at terminal 14' and applied to the input 19 of comparator 17. Another portion is broadcasted by loudspeaker 12. A portion of the broadcasted sound is detected by microphone 1 and applied to the terminal 18 of comparator 17. If the losses inserted in the control variable loss circuits 21 and 22 are zero the VS circuit 20 shown in FIG. 1 operates in the same manner as the prior art VS circuit. Thus, under the receiving condition the level of the received signal at terminal 19 is sufficiently higher than the level of the signal applied to other terminal 18 of the comparator 17. Accordingly, the comparator produces a negative output $x$ in response to such difference in the signal levels, and the VS circuit maintains the receiving condition.

During the receiving condition in which the signal level at terminal 19 is higher than that at terminal 18, the comparator 23 produces a negative output, whereas the comparator 24 produces a positive output. Accordingly, diode 25 is cut off, thus producing a zero output $y$, whereas diode 26 becomes conductive thereby charging capacitor 30 through resistor 28.

As the charging voltage $z$ increases in the positive direction, the loss in the control variable loss circuit 22 increases along the characteristic curve shown in FIG. 3, thus attenuating the level of the received signal at terminal 19. Since this control is a closed loop negative feedback control including terminal 19, comparator 24, variable loss circuit 22 and terminal 19 it is possible to cause the signal level at terminal 19 to approach the signal level at terminal 18 if the gain of the closed loop were suitably selected. However, since the signal level at terminal 19 is never decreased below that at terminal 18, the receiving condition is maintained always at stable states.

As has been described hereinabove, the VS circuit shown in FIG. 1 functions such that as the user commences talking while maintaining the loudspeaker and the microphone at definite positions, the signal level at terminal 19 is automatically controlled by utilizing the signal level at terminal 18 as a reference which is determined by said definite positions of the loudspeaker and the microphone, so that so long as the user predetermines the positions of the loudspeaker and microphone before commencing the talking, the difference in the signal levels at terminals 18 and 19 is automatically minimized under said conditions.

Let us now consider a case wherein a transmitting signal is offered during signal receiving. At this time the signal level at terminal 18 is increased by the addition of the transmitting signal whereby the output $x$ from the comparator 17 increases gradually in the positive direction and the VS circuit 20 is switched to the transmitting condition from the receiving condition. Thus, the Vs circuit 20 shown in FIG. 1 permits ready offering of the transmitting signal because it operates to minimize the difference in the signal levels at terminals 18 and 19 under the receiving condition.

As described hereinabove, when the user maintains the microphone and the loudspeaker at definite positions at the time of commencing talking the VS circuit functions to automatically determine the value of the loss in the control variable loss circuit 22 in accordance with said definite positions. However, once the talking is commenced, the user is free to decrease the distance between the microphone and the loudspeaker but by the operation of the circuit described above it is impossible to vary the value of the loss in the control variable loss circuit 22 in accordance with the variation in the positions of the loudspeaker and microphone, because the control signal $z$ is memorized by the memory circuit 35. For this reason, even while receiving a signal the level of the received signal at terminal 18 exceeds that at terminal 19 whereby the VS circuit causes a misoperation of the receiving blocking action.

Such misoperation caused by the variation of external conditions of the telephone set can be prevented by the reset circuit 32 which resets the charging voltage of the memory capacitor 30 for eliminating the loss inserted in the control variable loss circuit 22. Thus, the reset circuit 32 is driven by the output $x$ from the caparator 17 and short circuits the memory capacitor 30 when the VS circuit 20 is switched to the transmitting condition. As a consequence, the loss inserted in the control variable loss circuit 22 is reset to no loss condition each time the VS circuit is switched to the transmitting condition, whereas when the VS circuit is switched to the receiving condition, the loss in the control variable loss circuit 22 is automatically reset by the received signal. For this reason, even when the circuit is switched to the transmitting condition by the fact that the user brings the loudspeaker closer to the microphone the control variable loss circuit 22 will be immediately reset thus returning the VS circuit to the receiving condition by the received signal. Accordingly, a new control is commenced according to new relative position between the loudspeaker and the microphone established by the user. In this manner, regardless of the misoperation of the circuit the value of the loss of the control variable loss circuit 22 is restored automatically to the original value.

While foregoing description relates to the operation of the VS circuit when a signal is received. When the VS circuit is switched to the transmitting condition as a result of reception of a transmitting signal, the signal level at terminal 18 will become higher than the signal level at terminal 19 with the result that the control variable loss circuit 21 performs an automatic control which brings the signal level at terminal 18 closer to the signal level at the terminal 19 thus permitting easy offering of the received signal. Also during the transmitting condition, the condition may be varied due, for example, to the connection by a third party of a branch telephone set in parallel with the loudspeaking telephone set while it is used. This degrades the anti-sidetone characteristic of the anit-sidetone circuit 5 thus causing blocking of the transmitting signal. However, such condition can be restored to the original condition by the reset circuit 31 in the same manner as in the case of receiving signal.

When controlling the transmitting condition a problem occurs which is not encountered during the receiving condition. More particulary, when the signal level at terminal 18 is compressed for bringing it close to the signal level at terminal 19 and when the gain of the closed loop increased to perform stronger control, the output $x$ of comparator 17 will be brought in a range of $0<x<x_o$ in FIG. 2 (where $x_o$ represents a limiting value that can maintain the transmitting condition) with the result that the VS circuit assumes an operating condition intermediate of the receiving condition and the transmitting condition thereby attenuating the transmitting signal. For the purpose of preventing such undesirable phenomenon, in the embodiment shown in FIG. 1, a control passage 33 shown by dotted lines if provided which functions to increase the gain of the comparator 17 by utilizing control signal $y$ concurrently with the insertion of a loss in the control variable loss circuit 21 caused by the increase in the control signal $y$. If the gain of the comparator 17 is selected suitably by the control signal $y$, it is possible to control the difference between the signal levels at terminals 18 and 19 until the output $x$ from the comparator 17 reaches the limiting value ($x = x_o$) at which the transmitting condition can be maintained.

Figure 4:
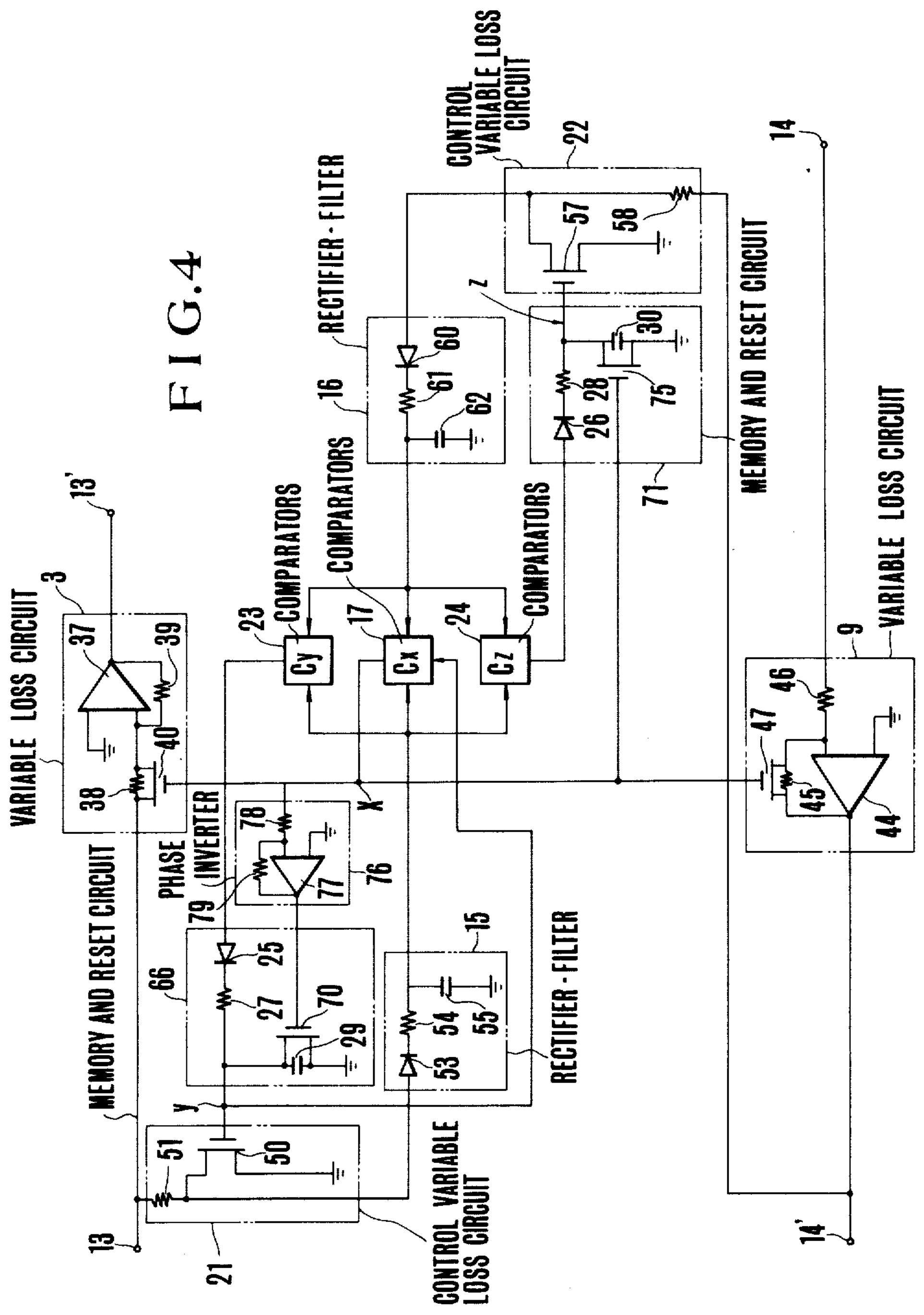
FIG. 4 is a connection diagram showing the detail of the novel voice switch circuit shown in FIG. 1.

The detail of the embodiment of this invention shown in FIG. 1 will now be described with reference to FIGS. 4 to 7. As shown in FIG. 4, the variable loss circuit 3 provided on the transmitting side for the purpose of prefenting howling comprises an operational amplifier 37, fixed resistors 38 and 39, and a field effect transistor (MOSFET) 40 which controls the magnitude of the gain of the variable loss circuit 3. The variable loss circuit 9 provided on the receiving side for the purpose of preventing howling comprises an operational amplifier 44, resistors 45 and 46 and a MOSFET 47 which controls the gain of the circuit 9. The control variable loss circuit 21 on the transmitting side comprises a MOSFET 50 for varying the loss, and a fixed resistor 51, whereas the control variable loss circuit 22 on the receiving side similarly comprises a MOSFET 57 for varying the loss and a fixed resistor 58. The rectifier-filter circuit 15 on the transmitting side is comprised by a diode 53, a smoothing resistor 54, and a smoothing capacitor 55, whereas the rectifier-filter circuit 16 on the receiving side is comprised by a diode 60, a smoothing resistor 61 and a smoothing capacitor 62. A memory and reset circuit 66 on the transmitting side comprises a diode 25, a fixed resistor 27, a memory capacitor 29 and a MOSFET 70 for resetting. In the same manner, the memory and reset circuit 71 on the receiving side comprises a diode 26, a fixed resistor 28, a memory capacitor 30 and a MOSFET 75 for resetting. Further, there is provided a phase inverting circuit 76 comprising an operational amplifier 77 and fixed resistors 78 and 79.

Operational amplifiers are used in the variable loss circuits 3 and 9 and the phase inverting circuit 76 and it is well known in the art that the gain of such amplifiers is determined by the values of the feedback resistor and the input resistor of the amplifiers. It is also well known that a field effect transistor has such characteristic that the resistance between its source and drain electrodes can be varied greatly by varying the bias voltage impressed across the gate and source electrodes thereof. Accordingly in this embodiment, the resistance variation between the drain and source electrodes of the field effect transistro is used to control the variable losses.

In both variable loss circuits 3 and 9 provided for the purpose of preventing howling the gain of the amplifiers in the operational amplifiers is controlled by MOSFETS. In the variable loss circuit 3 the MOSFET is connected in parallel with the input resistor of the operational amplifier, whereas in the variable loss circuit 9 the MOSFET is connected in parallel with the feedback resistor of the operational amplifier. The gate voltages of these two MOSFETs are controlled by the output $x$ from the comparator 17. Upon reception of a transmitting signal the output $x$ from comparator 17 increases in the positive direction with the result that the resistance between the drain and source electrodes of the MOSFETs decreases. Consequently, the input resistance to the operational amplifier 37 decreases thereby decreasing the loss in the variable loss circuit 3 including this amplifier. On the other hand, the loss in the variable loss circuit 9 increases. In other word the circuit in which a loss has been inserted on the receiving side is switched to the transmitting condition. On the other hand, where a receiving signal is applied, the output $x$ from the comparator 17 increases in the negative direction thereby increasing the drain-source resistance of the MOSFET. As a consequence the loss in the variable loss circuit 3 increases whereas that in the variable loss circuit 9 decreases.

Control variable loss circuits 21 and 22 are constituted by resistors 51 and 58, and MOSFETs 50 and 57, respectively. When a transmitting signal is applied, the output from the comparator 23 increases in the positive direction and at the same time when this output is memorized in the memory copacitor 29 this output is also applied to the gate electrode of MOSFET 50 as the bias voltage. Consequently, the resistance between the drain and source electrodes of MOSFET 50 decreases thus inserting a loss in the variable loss circuit 21. Accordingly, the transmission control signal applied to the rectifier-filter circuit 15 is compressed thus decreasing the difference between two inputs applied to comparator 17. At this time, the output from comparator 24 increases in the negative direction so that no loss is inserted in the variable loss circuit 22. Furthermore, as the circuit has been switched to the transmitting condition the output $x$ from comparator 17 still maintains a positive voltage. Accordingly, the gate electrode of MOSFET 75 provided for resetting is always impressed with a positive bias and the gate electrode of MOSFET 70 is biased negatively by the phase inverting circuit 76. Thus, the resistance between the drain and source electrodes of MOSFET 75 for resetting decreases thereby resetting the signal that has been stored in the memory capacitor 30. However, the resistance between the drain and source electrodes of MOSFET 70 for resetting is sufficiently high so that the signal that has been stored in the memory capacitor 29 would not be reset. Conversely, when a received signal is applied the signal in the memory capacitor 27 is reset so as to insert a loss in the variable loss circuit on the receiving side.

The controls of the above described embodiments are all of the type wherein a smaller one of two inputs applied to the comparator is used as a reference for compressing a larger input. It should be understood, however, that the same advantageous control can also be provided by using a larger signal as the reference for amplifying a smaller input. The VS circuit in which a larger one of two inputs to the comparator is used as the reference for amplifying smaller input is illustrated in FIG. 5.

Figure 5:
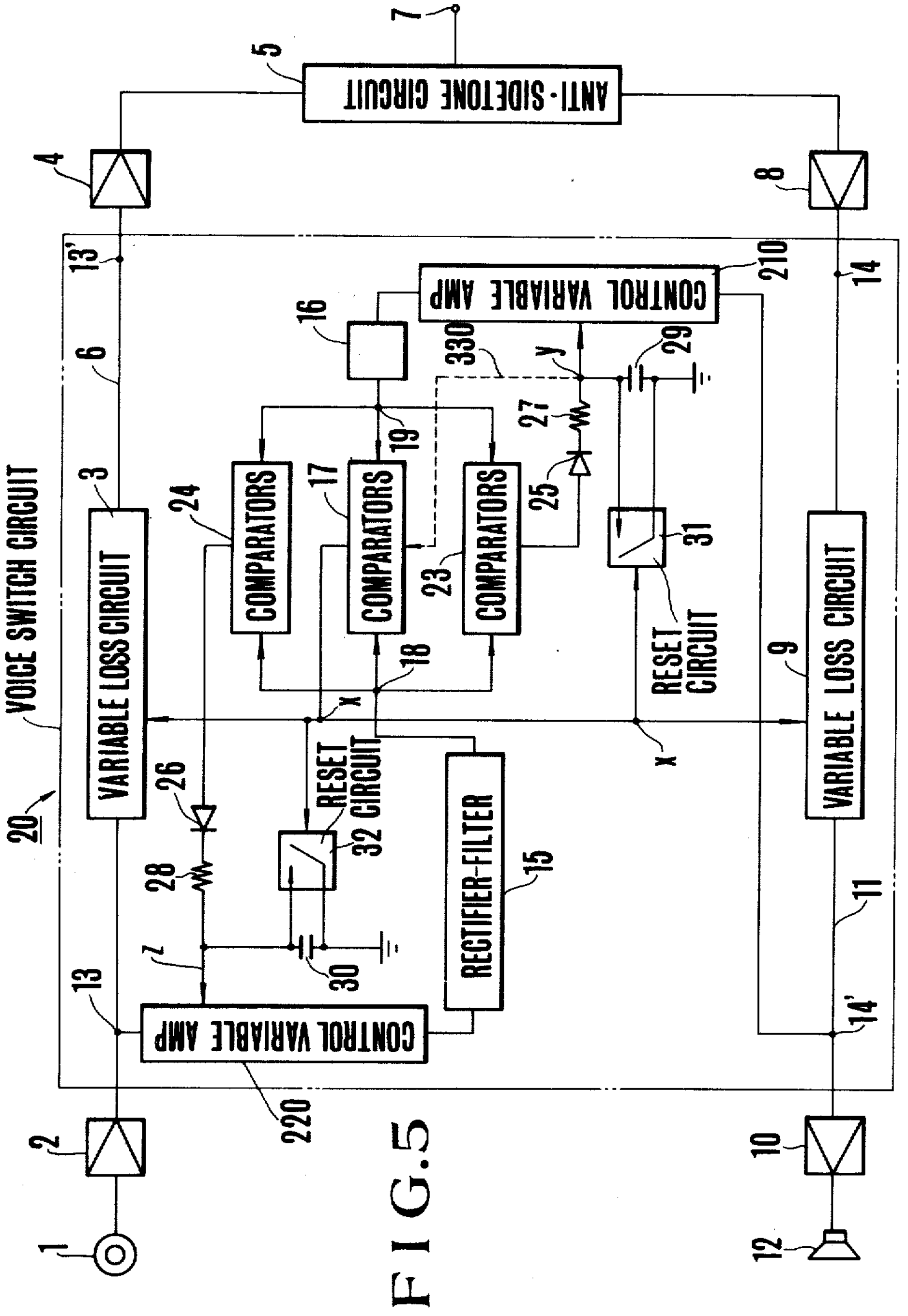
FIG. 5 is a block diagram showing a modified embodiment of the voice switch circuit embodying the invention.
Figure 7:
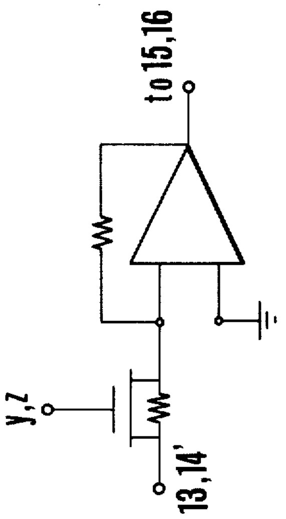
FIG. 7 shows the connection of a variable amplifier utilized in the circuit shown in FIG. 5.
Figure 6:
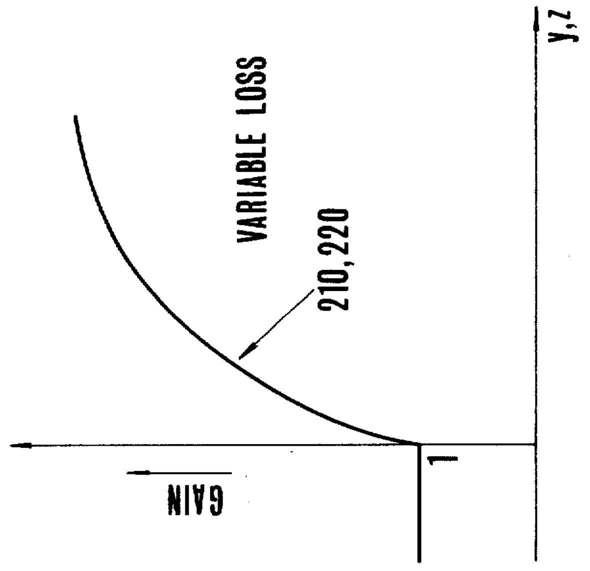
FIG. 6 is a graph showing the gain characteristic of the control variable gain circuit utilized in the circuit shown in FIG. 5

The circuit shown in FIG. 5 has substantially the same construction as that shown in FIG. 1 but the circuit shown in FIG. 5 is identical to that shown in FIG. 1 except that the control variable loss circuits 21 and 22 shown in FIG. 1 have been replaced by control variable amplifiers 220 and 210, respectively, that the variable amplifier 210 inserted on the receiving side is controlled by the control signal $y$, and that the variable amplifier 220 inserted on the transmitting side is controlled by the control signal $z$ As shown in FIG. 6, each of the variable amplifiers 210 and 220 has a characteristic such that their gains increase as the control signals $y$ and $z$increase. A variable amplifier can be constituted by an operational amplifier and a field effect transistor as shown in FIG. 7.

The circuit shown in FIG. 5 operates as follows. Assume now that a received signal is applied as an input. A portion of the received signal is applied to one input terminal 19 of the comparator 17 and another portion is applied to the other input 18 of the comparator 17 via microphone 1. In the case of the received signal, the level of the round signal applied to terminal 18 is lower than the level of the received signal applied to terminal 19. Under these conditions, the output from comparator 24 increased in the positive direction and the gain of the variable amplifier 220 is increased by the control signal $z$ As a consequence, the level of the round signal at terminal 18 approaches to the level of the received signal impressed upon terminal 19. In the case of a transmitting signal, the gain of the variable amplifier 210 increases thus decreasing the level difference between two inputs of the comparator 17.

In the case of the control under the transmitting condition, a problem not presenting under the receiving condition occurs. More particularly, when the signal level at terminal 19 is increased for causing it to approach to the signal level at terminal 18 and when the gain of the closed loop is increased for the purpose of intensifying the control, the output $x$ from comparator 17 will enter into a range of $0<x<x_0$ of FIG. 1 (where $x_0$ represents a limiting value that can maintain the transmitting condition). Then the VS circuit will assume an operating condition intermediate of the receiving condition and the transmitting condition, thereby attenuating the transmitting signal. For the purpose of preventing such undesirable phenomenon, in the embodiment shown in FIG. 5 there is provided a control passage 330 (shown by dotted lines) which operates to increase the gain of the comparator 17 by the control signal $y$ at the same time when the signal $y$ increases and a gain of the variable amplifier 210 increases. In this manner by suitable selection of the increase in the gain of the comparator effected by the control signal $y$, under the transmitting condition, it is possible to control the difference in the signal levels at terminals 18 and 19 until the output $x$ from the comparator 17 reaches the limiting value ($x = x_0$) that can maintain the transmitting condition. Other operations of the circuit shown in FIG. 5 are similar to those of the circuit shown in FIG. 1.

While the invention has been shown and described in terms of some preferred embodiments thereof, it should be understood that the invention is by no means limited to these specific embodiments and that many changes and modifications will be obvious to one skilled in the art without departing from the true spirit and scope of the invention as defined in the appended claims.

What is claimed is:

1. In a voice switch circuit for use in a loudspeaking telephone circuit of the class comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting circuit is higher than the signal level of the receiving circuit for inserting a loss in the receiving circuit thereby establishing a transmitting condition, the improvement wherein said voice switch circuit comprises a control variable loss circuit inserted between said receiving circuit and said main comparator, a second comparator for comparing the output signal level from said control variable loss circuit with the signal level of said transmitting circuit, and means connected between said second comparator and said control variable loss circuit for operating said control variable loss circuit under the receiving condition for decreasing the level difference between two inputs of said main comparator.

2. In a voice switch circuit for use in a loudspeaking telephone circuit of the class comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting circuit is higher than the signal level of the receiving circuit for inserting a loss in the receiving circuit thereby establishing a transmitting condition, the improvement wherein said voice switch circuit comprises a first control variable loss circuit inserted between said receiving circuit and said main comparator, a second control variable loss circuit inserted between said transmitting circuit and said main comparator, first and second comparators for comparing the level of the output signal from said first control variable loss circuit with the level of the output signal from said second control variable loss circuit, first means connected between said first comparator and said first control variable loss circuit for maintaining the loss in said first control variable loss circuit under the receiving condition, and second means connected between said second comparator and said second control variable loss circuit for maintaining the loss in said second control variable loss circuit under the transmitting condition.

3. The voice switch circuit according to claim 2 wherein said first means comprises a first memory device that memorizes the level of the output from said first comparator under the receiving condition.

4. The voice switch circuit according to claim 2 wherein said second means comprises a second memory device that memorizes the level of the output from said second comparator under the transmitting condition.

5. The voice switch circuit according to claim 3 which further comprises first reset means which reset the content of said first memory device when the circuit is switched to the transmitting condition.

6. The voice switch circuit according to claim 4 which further comprises second reset means for resetting the content of said second memory device when the circuit is switched to the receiving condition.

7. The voice switch circuit according to claim 4 which further includes circuit means for increasing the gain of said main comparator in accordance with the output level from said second memory device under the transmitting condition.

8. In a voice switch circuit for use in a loudspeaking telephone circuit of the type comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting circuit is higher than the signal level of the receiving circuit for inserting a loss in the receiving circuit thereby establishing a transmitting condition, the improvement wherein said voice switch circuit comprises a control variable amplifier circuit inserted between said transmitting circuit and said main comparator, a second comparator for comparing the output level of said control variable amplifier circuit with the signal level of said receiving circuit, and means connected between said second comparator and said control variable amplifier circuit for operating said control variable amplifier circuit under the receiving condition for minimizing the difference in the level of two inputs to said main comparator.

9. In a voice switch circuit for use in a loudspeaking telephone circuit of the type comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in the transmitting circuit thereby establishing a receiving condition, and a receiving variable loss circuit responsive to a condition wherein the signal level of the transmitting is higher than the signal level of the receiving circuit for inserting a loss in the receiving circuit thereby establishing a transmitting condition, the improvement wherein said voice switch circuit comprises a first control variable amplifier circuit inserted between said receiving circuit and said main comparator, a second control variable amplifier circuit inserted between said transmitting circuit and said main comparator, first and second comparators for comparing the output signal level of said first control variable amplifier circuit with the output signal level of said second control variable amplifier circuit, second means connected between said second comparator and said second control variable amplifier circuit for maintaining the gain of said second control variable amplifier circuit under the receiving condition, and first means connected between said first comparator and said first control variable amplifier circuit for maintaining the gain of said first control variable amplifier circuit under the transmitting condition.

10. The voice switch circuit according to claim 9 wherein said first means comprises a first memory device for memorizing the output level of said first comparator under the transmitting condition, and said second means comprises a second memory device for memorizing the output level of said second comparator under the receiving condition.

11. The voice switch circuit according to claim 10 which further comprises first reset means for resetting the content of said first memory device when the circuit is switched to the receiving condition.

12. The voice switch circuit according to claim 10 which further comprises second reset means for resetting the content of said second memory device when the circuit is switched to the transmitting condition.

13. The voice switch circuit according to claim 9 which further comprises circuit means for increasing the gain of the main comparator in accordance with the output level of said first memory device under the transmitting condition.

14. In a voice switch circuit for use in a loudspeaking telephone circuit of the type comprising a main comparator for comparing the signal level of a receiving circuit with the signal level of a transmitting circuit, a transmitting variable loss circuit responsive to a condition wherein the signal level of the receiving circuit is higher than the signal level of the transmitting circuit for inserting a loss in said transmitting circuit thereby establishing a receiving condition, and a receiving variable loss circuit responsive to a condition wherein the signal level of the transmitting circuit is higher than the signal level of the receiving circuit for inserting a loss in said receiving circuit thereby establishing a transmitting condition, the improvement wherein said voice switch circuit comprises a first control variable loss circuit inserted between said receiving circuit and said main comparator, a second control variable loss circuit inserted between said transmitting circuit and said main comparator, first and second comparators for comparing the output signal level of said first control variable loss circuit with the output signal level of said second control variable loss circuit, a first memory device connected between said first comparator and said first control variable loss circuit for memorizing the output level of said first comparator for maintaining the loss in said first control variable loss circuit only under the receiving condition, a second memory device connected between said second comparator and said second control variable loss circuit for memorizing the output level of said second comparator for maintaining the loss in said second control variable loss circuit only under the transmitting condition, first reset means for resetting the content of said first memory device when the circuit is switched to the transmitting condition, second reset means for resetting the content of said second memory device when the circuit is switched to the receiving condition, and circuit means for increasing the gain of said main comparator in accordance with the output level of said second memory device during the transmitting condition.

15. The voice switch circuit according to claim 10 which further comprises first reset means for resetting the content of said first memeory device when the circuit is switched to the receiving condition and second reset means for resetting the content of said second memory device when the circuit is switched to the transmitting condition.

* * * * *